US006903532B2

United States Patent
Boys et al.

(10) Patent No.: US 6,903,532 B2
(45) Date of Patent: Jun. 7, 2005

(54) METHOD AND APPARATUS FOR STARTING AN INDUCTION MOTOR

(75) Inventors: John T. Boys, North Shore (NZ); Udaya K. Madawala, Takanini (NZ)

(73) Assignee: Auckland Uniservices Limited, Auckland (NZ)

(*) Notice: Subject to any disclaimer, the term of this patent is extended or adjusted under 35 U.S.C. 154(b) by 0 days.

(21) Appl. No.: 10/470,113

(22) PCT Filed: Jan. 25, 2002

(86) PCT No.: PCT/NZ02/00009

§ 371 (c)(1),
(2), (4) Date: Nov. 13, 2003

(87) PCT Pub. No.: WO02/060046

PCT Pub. Date: Aug. 1, 2002

(65) Prior Publication Data

US 2004/0061473 A1 Apr. 1, 2004

(30) Foreign Application Priority Data

Jan. 26, 2001 (NZ) .............................................. 509552

(51) Int. Cl.[7] ................................................. H02P 1/24
(52) U.S. Cl. ...................... 318/727; 318/459; 318/500; 318/778; 318/785
(58) Field of Search .............................. 318/727, 459, 318/500, 778, 785, 786, 430, 431, 432

(56) References Cited

U.S. PATENT DOCUMENTS

| 4,072,880 A | * | 2/1978 | Oshima et al. ............. 323/321 |
| 4,928,043 A | * | 5/1990 | Plunkett ..................... 318/254 |
| 5,376,866 A | * | 12/1994 | Erdman ....................... 318/254 |
| 5,397,971 A | * | 3/1995 | McAllister et al. ......... 318/254 |
| 5,739,664 A | * | 4/1998 | Deng et al. ................. 318/808 |
| 5,838,085 A | * | 11/1998 | Roesel et al. ............... 310/113 |
| 6,172,498 B1 | * | 1/2001 | Schmidt et al. ......... 324/207.12 |
| 6,392,370 B1 | * | 5/2002 | Bedini ........................ 318/140 |

FOREIGN PATENT DOCUMENTS

| EP | 0031688 | 7/1981 |
| EP | 0113503 | 4/1987 |
| WO | WO 97/30509 | 8/1997 |

* cited by examiner

*Primary Examiner*—Rina Duda
(74) *Attorney, Agent, or Firm*—Garvey, Smith, Nehrbass & Doody, L.L.C.; Seth M. Nehrbass; Brett A. North

(57) ABSTRACT

A starting circuit for an induction motor is provided whereby a stationary rotor flux is established then a stored charge supplied to a motor winding in order to provide a starting torque. Before applying a mains power supply to the motor after the starting torque has been applied, a back EMF is sensed, directly or indirectly, to provide an indication that the rotor is turning before the mains supply is connected to the motor. This provides a reliable and simple method for ensuring that a mains supply may be safely connected to the motor.

17 Claims, 2 Drawing Sheets

METHOD AND APPARATUS FOR STARTING AN INDUCTION MOTOR

FIELD OF THE INVENTION

This invention relates to a starting circuit for an electric induction motor, and in particular relates to a circuit and method for ensuring that the motor is turning properly before a full mains supply is applied to the windings of the motor.

BACKGROUND

It is well known that starting induction motors can cause a number of problems. One of the most significant is the large amount of inrush power that can be required to start the motor. During start up phase, induction motor will draw currents, which exceed the usual current supplied to the motor when it is running at full load. The very high current demand can have a detrimental effect upon the local electricity supply, for example by causing a "brown out" due to the reduction in the supply voltage.

These problems associated with starting induction motors are set forth in published international application no. WO97/30509 (McDonald), together with a circuit and method for effectively overcoming the problem of current surges associated with starting induction motors.

The solution proposed by McDonald is to provide a stag circuit for a multi-phase motor whereby a unidirectional current derived from the mains supply is supplied between a first combination of the winding terminals of the motor. This establishes a stationary rotor flux in the rotor. At the same time as the stationary rotor flux is being established, a capacitor is charged from the mains supply. When the stationary rotor flux has been established, and when the capacitor has both charged, the supply of unidirectional current to the first combination of terminals is terminated and the charge on the capacitor is applied to a second combination of terminals. The second combination of terminals is selected to generate a stator flux at an angle between 0 and 180 degrees to the stationary rotor flux. Therefore, when the charge on the capacitor is applied to the second combination of terminals, the rotor will attempt to move into the desired position governed by the orientation of the fields. A very high voltage can be built up upon the capacitor, and therefore a correspondingly high current may be provided in the winding between the second combination of terminals, so a very significant and substantial starting torque can been applied to the motor to initiate rotation. Once rotation has been initiated in this fashion, then the mains supply can be connected to the terminals of the motor in the known way to continue the rotation of the motor.

Therefore, the starting circuit described in McDonald has the significant advantage of being capable of being arranged to provide a very high starting torque without drawing a correspondingly high surge current from the mains supply during start up.

A significant disadvantage with the circuit described in McDonald is that there is no easily measured yet accurate and reliable way of determining whether or not the machine has actually started after the charge from the capacitor has been applied to the second combination of terminals. Clearly, if the motor has not started, ie. if the rotor has not started rotating, then applying the fill mains supply to the motor can result in destruction of the motor. Such situations may often occur, for example when the rotor becomes locked or something in the circuitry is faulty so that the rotor does not start turning when the charge on the capacitor is applied to the second combination of terminals. The condition is worse with a single phase supply as there is then no natural rotation of the supply voltage.

In McDonald, the initiation of the connection of the mains supply to the motor terminals occurs when any of the following three events happens:
1. If the current delivered by the capacitor to the second combination of terminals falls to zero before a predetermined time period elapses, or
2. If the predetermined time period elapses before the current delivered by the capacitor falls to zero, or
3. If the rate of change of current from the capacitor goes to zero before the predetermined time period elapses.

Therefore, the strategy is not dependent upon any indication as to whether the rotor is turning, so there is no indication as to when it is safe to connect the supply to the motor.

OBJECT OF INVENTION

Accordingly, it is an object of the present invention to provide a starting circuit, or a method of starting an induction motor, which will at least go some way toward overcoming the foregoing disadvantages, or to at least provide the public with a useful choice.

SUMMARY OF THE INVENTION

In one aspect the invention may broadly be said to consist in a starting circuit for an electric induction motor having a plurality of phase windings to be energised from an electricity supply, the phase windings having at least three terminals for connection to the supply, the circuit comprising a first switching means arranged and controllable to conduct a uni-directional current derived from the supply between a first combination of the terminals to establish a stationary rotor flux in the rotor of the motor, a second switching means arranged and controllable to supply a starting current between a second combination of the terminals selected to generate a stator flux at an angle to the stationary rotor flux, switch control means to control the first switch means to establish the stationary rotor flux and to control the second switching means to initiate supply of the starting current to provide a starting torque for the motor, and back EMF sensing means to sense a back EMF generated by rotation of the rotor to sense whether the rotor has turned sufficiently to be in a condition to connect the motor to the supply.

In a further aspect the invention may broadly be said to consist in a method of starting an electric induction motor having a plurality of phase windings, the method comprising the steps of delivering a uni-directional current to the motor to establish a stationary rotor flux in the rotor of the motor, delivering a starting current to the motor to produce a stator flux at an angle to the stationary rotor flux to produce a motor starting torque, detecting the back EMF produced by rotation of the rotor in response to the staring torque, and determining whether one or more characteristics of the detected back EMF indicates that the motor is in a condition for connection to an operating supply.

In a further aspect the invention may broadly be said to consist in a staring circuit for an electric asynchronous motor, the circuit including a detection means to detect a voltage or current generated by rotation of the rotor during starting for the purpose of ascertaining whether the motor is in a condition to complete starting the motor.

In a further aspect the invention may broadly be said to consist in a starting circuit for an electric asynchronous motor, the circuit including a measuring means to measure a time period from the initiation of rotation for the purpose of ascertaining whether the motor is in a condition to complete starting of the motor.

Preferably the detection means includes measuring means to provide an indication of the magnitude of the detected voltage or current.

Preferably measuring the time period means measuring the time from the moment of initiation of rotation of the rotor to the moment of detecting the first zero crossing of motor back EMF in a selected stator winding of the motor.

Preferably the circuit includes comparing means to compare the magnitude of the detected/measured voltage, current or time period with a predetermined voltage/current or time period, the predetermined voltage/current or time period being indicative of the motor being in the condition to complete starting.

Preferably the predetermined voltage, current or time period is indicative of rotational speed of the motor.

Preferably the circuit includes means to complete starting of the motor if the magnitude of the detected voltage or current equals or exceeds a predetermined voltage or current, or the measured time period is less than the predetermined time period.

Preferably the detected voltage comprises the back EMF generated in a stator winding by rotation of the rotor.

Preferably the motor is an induction motor having a plurality of windings to be energised from an electricity supply.

Preferably the circuit includes switching means arranged and controllable to supply a current to a first winding to generate a stationary rotor flux.

Preferably the switching means is also arranged and controllable to supply a starting current selected to generate a stator flux, which is selected to ordinarily cause rotation of the rotor.

Preferably the stator flux is generated at 60 or 120 degrees to the stationary rotor flux.

Preferably the electricity supply is connected to the motor if the back EMF equals or exceeds the predetermined value or the measured time period is below the predetermined value.

In a further aspect the invention may broadly be said to consist in a method of starting an electric asynchronous motor, the method including detecting a voltage or current generated by rotation of the rotor or measuring a time period from the initiation of rotation of the rotor during starting for the purpose of ascertaining whether the motor is in a condition to complete starting the motor.

Preferably the step or detection includes providing an indication of the magnitude of the detected voltage, current or the time period.

Preferably the method includes the step of comparing the magnitude of the detected voltage or current with a predetermined voltage or current, the predetermined voltage or current being indicative of the motor being in the condition to complete starting.

Preferably the method includes the step of comparing the magnitude of the mere time with a predetermined time period, the predetermined time period being indicative of the motor being in the condition to complete starting.

Preferably the method includes the step of completing starting of the motor if the magnitude of the detected voltage or current equals or exceeds the predetermined value or if the measured time period is less than the predetermined value.

Preferably the method includes supplying a starting current selected to generate a stator flux which is selected to ordinarily cause rotation of the rotor.

Preferably the method includes the step of connecting the electricity supply to the motor if either the back EMF (or the capacitor voltage) equals or exceeds the predetermined value or the measured time period is less than the predetermined value.

Preferably the method includes the step of discontinuing staring of the motor if the back EMF or capacitor voltage or time period measurements indicate that the motor is not in a condition for starting.

Preferably the method includes the step of reinitiating the starting sequence if the back EMF or time period measurement indicates that the motor is not in a condition for starting.

In a further aspect the invention may broadly be said to consist in a starting circuit for an electric asynchronous motor, the circuit including a measuring means to measure a time period from the initiation of rotation for the purpose of ascertaining whether the motor is in a condition to complete starting of the motor.

In a further aspect the invention may broadly be said to consist in a starting circuit for an electric asynchronous motor having a plurality of windings to be energised from an electricity supply, the circuit including;

a switching means arranged and controllable to establish a stationary rotor flux in the rotor of the motor, and capacitor storage means to supply a starting current selected to generate a stator flux at an angle to the stationary rotor flux which is selected to ordinarily cause rotation of the rotor, and means to measure the back EMF or the capacitor voltage or the time required by the back EMF to reach a predefined value caused by the rotation of rotor and compare the back EMF or capacitor voltage or time with a predetermined value, and if the back EMF or the capacitor voltage reaches or exceeds the predetermined value or the measured time is below the predetermined value, initiate connection of the mains supply to the motor.

In a further aspect the invention may broadly be said to consist in a method of starting an electric induction motor having a plurality of phase windings, the method comprising the steps of;

delivering a controlled unidirectional current to the motor to establish a stationary flux in the motor, delivering a starting current from a capacitor to the motor to produce a stator flux, which will ordinarily turn the rotor, measuring the back EMF or the capacitor voltage or the time required to reach a predetermined value of back EMF in a selected phase winding in order to determine whether the motor is in a condition for application of mains supply, and if the back EMF or capacitor voltage or time measurement indicates that the motor is in a condition for application of mains supply, initiating connection of mains supply to the motor.

Preferably the method includes the step of discontinuing starting of the motor if the back EMF or capacitor voltage or time measurement indicates that the motor is not in a condition for starting.

Preferably the method includes the optional step of reinitiating the starting sequence if the back EMF measurement indicates that the motor is not in a condition for starting.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists of the forgoing and also envisages constructions of which the following gives examples.

One preferred form of the present invention will now be described with reference to the accompanying drawings in which;

DRAWING DESCRIPTION

DESCRIPTION OF PREFERRED EMBODIMENT

Figure 1:
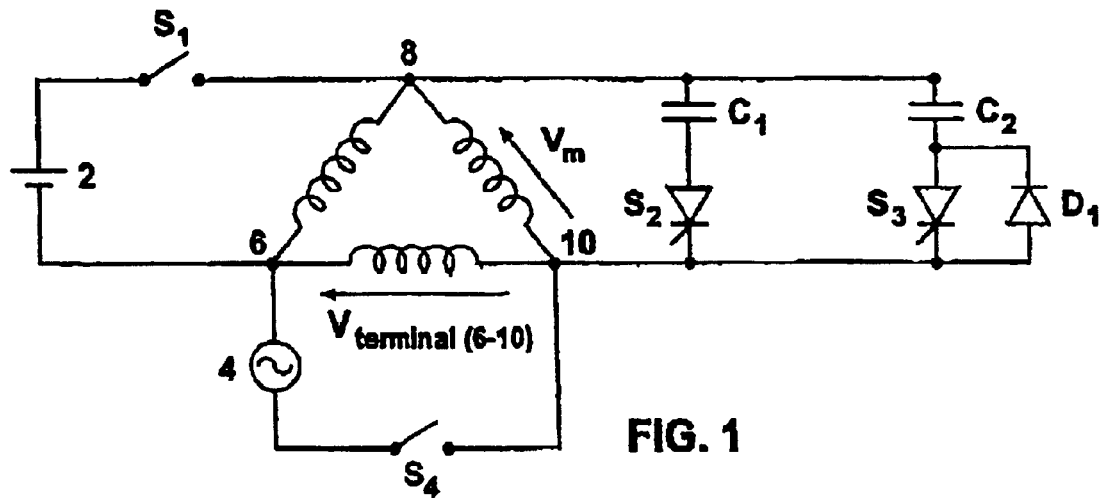
FIG. 1 is a simplified circuit diagram of a staring circuit connected to a three phase motor for operation from a single phase AC supply.

A simplified starting circuit shown connected to a three phase electric induction motor for operation from a single phase supply is shown in FIG. 1, in essence being a simplified diagram of the circuit described and illustrated in more detail in WO97/30509 (McDonald) which is incorporated herein by reference. A simplified diagram has been used to simplify the description of operation of the circuit, which may be understood in greater detail with reference to McDonald. However, for the purposes of providing a basic illustration of operation of the starting circuit, a description is briefly provided below.

Turning to FIG. 1, a unidirectional ie. a DC supply 2 (which is preferably derived from mains supply 4) can be connected across a first combination of terminals 6 and 8 via a switch S1 (which may comprise a transistor for example). Closing switch S1 provides a unidirectional current to the winding between terminals 6 and 8 and generates a stationary flux in the rotor of the motor.

Preferably, while the stationary rotor flux is being established, capacitors C1 and C2 are being charged, again with a unidirectional current. The derivation of the supply of capacitors C1 and C2 is not shown for convenience and case of illustration, but again is described in more detail in McDonald. A preferred method, as described in McDonald, is to charge the capacitors using the leakage inductance from the winding used to establish the stationary rotor flux so that a desired voltage can be achieved across the capacitors. However, this method of charging using the leakage inductance is not always practicable, particularly for large scale motors for the following reasons. Large scale motors tend to have small leakage inductances in contrast to their smaller counterparts. As a result, to charge capacitors to a predefined voltage in large scale motors, would require large transistors operating for a long time. Due to this longer charging time, transistors employed in the charging circuitry would then invariably require some form of cooling (heat sinking) which in turn results in adding extra components and hence adding cost to the circuitry. Therefore, to overcome these problems associated with the charging process described by McDonald, a transformer with a high voltage winding is a preferred method in this invention.

In this invention Capacitor C1 is much larger than capacitor C2. Capacitor C2 is the one, which is chosen to be connected across the winding between terms 8 and 10 during normal operation of the motor in the known Steinmetz configuration.

Once capacitor C1 has been charged sufficiently (for example up to between 1,000 and 2,000 volts), and once the stationary rotor flux has been established, switch S1 is opened and switch S2 (which may comprise an SCR device) is closed thereby applying the charge on capacitor C1 across the winding between terminals 8 and 10. A current begins flowing through the winding between terminals 8 and 10 thereby energising the winding, and generating a stator flux. This has the effect of causing the rotor to try to align itself in relation to the field produced by the stator winding. As the charge on the capacitor C1 is quite high, a significant stator flux is generated which causes rapid acceleration of the rotor.

After a predetermined time period corresponding to a time when the current supplied by capacitor C1 to the winding between terminals 8 and 10 would be reducing, ie. most of the energy from the capacitor has been transferred to the winding between terminals 8 and 10, switch S3 (again comprising a device such as an SCR) is closed. Because capacitor C2 is still charged, the effect of closing S3 results in S2 being reverse biased and therefore turning off. Capacitor C2 is now effectively connected across the winding between terminals 8 and 10, and after a very short time period calculated to ensure that S1 has been turned off, switch S4 is turned on to connect the mans supply 4 between terminals 6 and 10 (which connects the mains supply to the motor) so the motor continues to accelerate up to operating speed.

Figure 2:
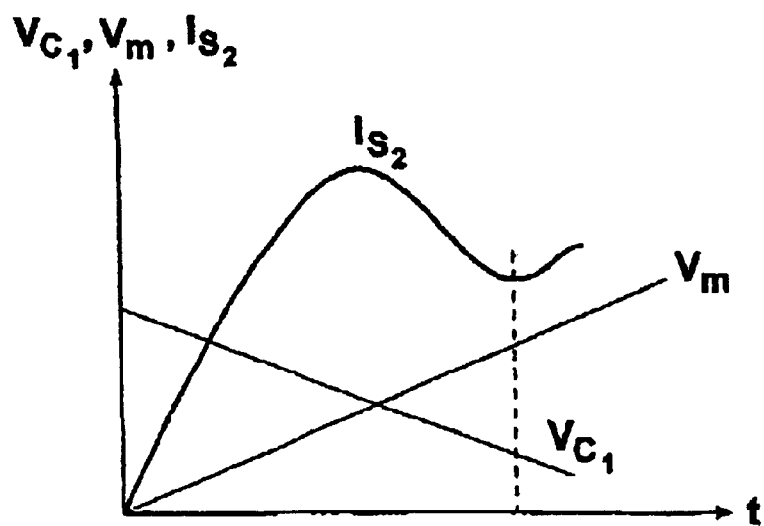
FIG. 2 is an illustrative graph of current through the second switch, voltage across the capacitor C1 and back EMF across the winding 6–10, of the circuit of FIG. 1 plotted against time.

Turning now to FIG. 2, a diagrammatic plot of voltage and current against time is shown. Firstly, considering the current IS2, being the current through switch S2, it can be seen that current from the capacitor begins to flow when switch S2 is closed, and as expected the current increases rapidly as it energises the winding between terminals 8 and 10 until a maximum is reached, after which the current begins to decline as energy is transferred to the winding both from the capacitor and from the rotating rotor, before increasing again.

As described above, normally, switch S3 will be closed shortly before, or near the minimum current flow IS2, and this is usually simply calculated by allowing a predetermined time period to elapse from closing S2.

Now considering the voltage VM across the winding between terminals 8 and 10, it will be seen that the voltage increases as the current flow increases over time through the winding. The voltage VC1 across C1 will decline overtime. However, if switch S3 is not closed, VC1 will not return to zero, but will instead stay at a level corresponding to the back EMF induced in the winding between terminals 8 and 10 as the rotor rotates relative to that winding. Accordingly, when switch S3 is closed, the voltage which will be preset on capacitor C1, will be the back EMF voltage induced by movement of the rotor.

The induced back EMF voltage in a winding will be directly proportional to the speed of rotation of the rotor relative to the stator. Therefore, the magnitude of the voltage on capacitor C1 when switch S2 is turned off, is the back EMF voltage, which will be directly proportional to the speed of rotation of the rotor.

Accordingly, a measurement of the voltage on capacitor C1 when switch S2 turns off, provides a reliable indication as to whether the rotor is in fact rotating, and of the speed of rotation of the rotor, so that an indication as to whether the motor is in an appropriate condition for application of mains supply can be established.

Figure 3:
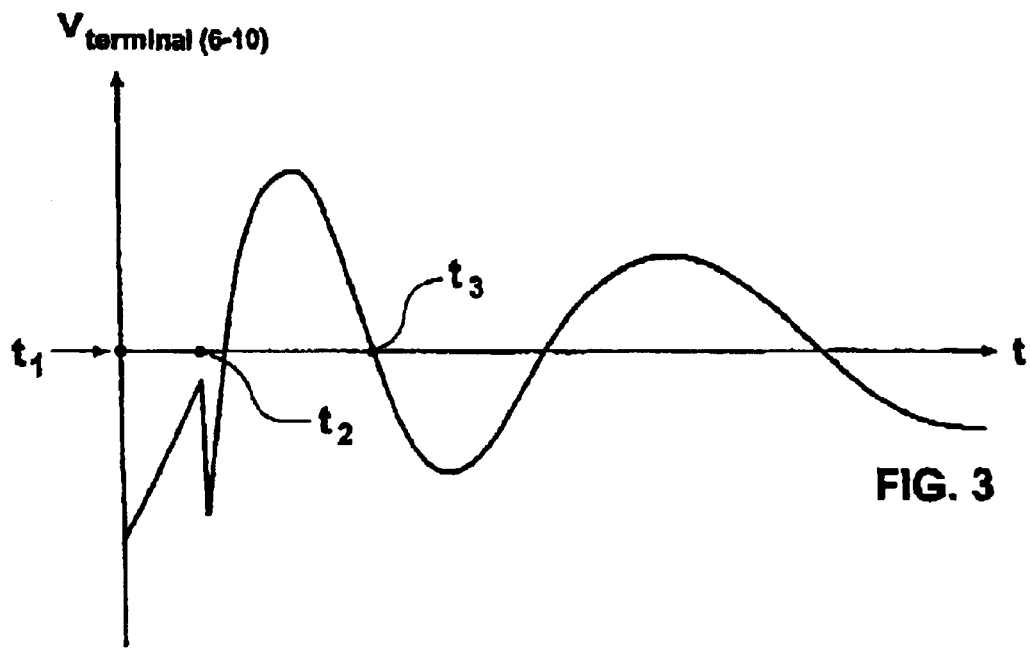
FIG. 3 is an illustrative graph of voltage across the winding 6–10 of the circuit of FIG. 1 plotted against time.

Alternatively, the voltage across the winding between terminals 6 and 10 can also be regarded as the back EMF voltage induced in the motor winding, neglecting the voltage drop due to winding inductance and resistance. This voltage plotted against time is shown in FIG. 3, where instants t1 and t2 correspond to the moments switches S2 and S3 are closed, respectively. This induced voltage, which delays down to zero if mains supply 4 is not connected to the motor after closing switch 3, is directly proportional to the speed of the rotor and therefore as the rotor slows down the period of this waveform increases as can be seen from FIG. 3. It is evident from the waveform that the ideal and earliest moment for closing switch 4 in order to connect the mains supply to the motor would be the instant t3 as the voltage across the winding is then essentially zero. Since the induced back EMF voltage in the winding is a direct indication of the speed of the rotor, an accurate estimate of the rotor speed can be obtained by measuring the time between the initiation of rotation and the voltage reaching a predefined value (ie: zero back EMF voltage). If this measured time exceeds a predefined value (ie: if the initial staring speed of the rotor is below the predefined starting speed), switch 4 will not be closed to connect the mains supply 4 to the motor.

Figure 4:
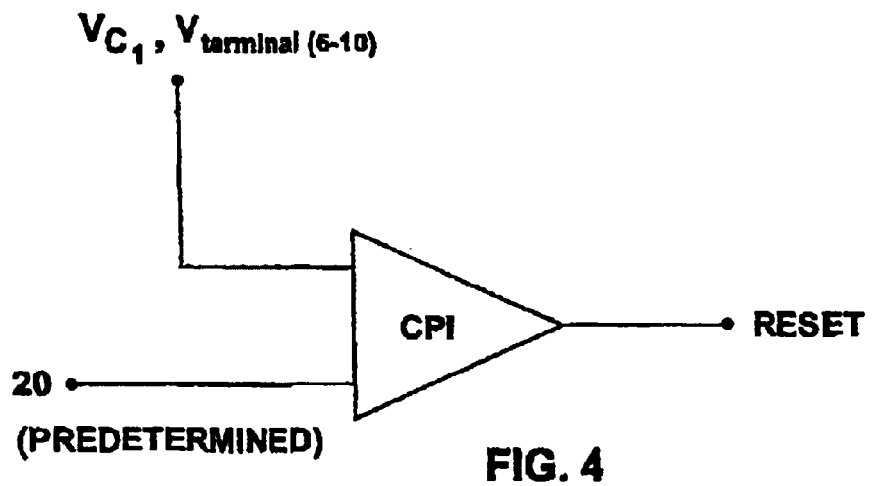
FIG. 4 is part of a simplified logic diagram of switching control according to the present invention.

Turning to FIG. 4, a comparator CP1 is shown. One input to the comparator is derived from a measurement of the voltage across capacitor C1. The measurement of voltage on capacitor C1 is easily established because in practical implementation of starting circuits corresponding to that shown in FIG. 1, the voltage across capacitor C1 is measured in any event to measure the charge that is delivered to C1 before switch S2 is closed. Therefore, the appropriate circuitry for providing a measurement of the voltage on capacitor C1 will already be in place and it is a simple matter to supply this to comparator C1. Similarly, for any given motor, the back EMF generated in a winding by any particular speed of rotor rotation is easily established and any selected signal which is indicative of an appropriate back EMF can be provided to the other input 20 to comparator C1. The output of comparator C1 may be provided to a reset line in the control circuitry for example so that if the signal derived from the voltage across capacitor C1 does not exceed the predetermined threshold value provided to input 20, then the starting sequence is reset for another attempt. Alternatively, the output of capacitor C1 may be provided to a disable line, which may establish some form of alarm. Naturally, further logic circuitry could be provided so that after a certain number of attempts, an alarm or other indication will be provided to a user.

The selection of the predetermined back EMF may for example be 50% of the rated rotor speed. Therefore, if normally at full rotational speed a back EMF of 320 volts would be present across the winding, then the signal at input 20 to the comparator may be representative of a back EMF of 160 volts.

Alternatively, referring to FIG. 3 again, the inputs to the comparator can also be the voltages at terminals 6 and 10. The output of the compactor will then change as the polarity of the voltage across the winding changes (ie: when the voltage across the winding goes through a zero crossing). Therefore the speed of the rotor immediately before connecting the mains supply to the motor, can thus be estimated by measuring the time to this moment from a known reference point in time.

Preferably, to ensure that the rotor has reached or exceeded the predefined threshold (safe) speed before connecting the mains supply to the motor, the starting procedure is carried-out twice every time the motor is connected to a new load. In the further attempt, the time between the first back EMF zero crossing after closing switch S3 and a reference point is measured without connecting the mains supply to the motor. If the measured time period is below the predefined value, the starting procedure is carried-out again assuming that the rotor will exceed the threshold speed in the second attempt and the mains supply is connected to the motor by closing switch 4 after the measured time period in the first attempt. However, if the measured capacitor voltage is below the predetermined value just prior to the moment of closing switch S4 in the second attempt, the switch S4 will not be closed as that indicates the rotor speed has not exceeded the predefined safe starting speed and hence the starting is discontinued.

This circuit described above has a number of advantages. Firstly, it is very fast, so the circuitry 'knows' within one mains cycle whether or not the motor has started. The alternative technique, as mentioned above, is to measure the motor current when switch S4 is turned on and if that motor current is too high, then turning off switch 4 before any damage is done. However, this has a disadvantage that the user has to wait several cycles ie. hundreds of milliseconds, before the decision can be made. The current method and apparatus provide a technique which is approximately two orders of magnitude faster than any other measurement that could be accurately made. It also has the advantage that it is very low cost. As described above, the circuitry for providing an indication of the voltage across capacitor C1 or voltage across winding terminals 6 and 10, is already present, so in essence all that is required is a comparator. However, it will be apparent to those skill in the art that the word techniques described above may be performed using indirect methods, for example by not sensing the back EMF directly.

We claim:

1. A starting circuit for an electric induction motor having a plurality of phase windings to be energised from an electricity supply, the phase windings having at least three terminals for connection to the supply, the circuit comprising a first switching means arranged and controllable to conduct a uni-directional current derived from the supply between a first combination of the terminals to establish a stationary rotor flux in the rotor of the motor, a second switching means arranged and controllable to supply a starting current between a second combination of the terminals selected to generate a stator flux at an angle to the stationary rotor flux, switch control means to control the first switch means to establish the stationary rotor flux and to control the second switching means to initiate supply of the starting current to provide a starting torque for the motor, and back EMF sensing means to sense a back EMF generated by rotation of the rotor to sense whether the rotor has turned sufficiently to be in a condition to connect the motor to the supply.

2. A starting circuit as claimed in claim 1 including a third switching means arranged and controllable to connect the supply to provide an operating supply to the terminals of the motor during normal running of the motor, and the switch control means controlling the third switching means to provide the operating supply subsequent to the starting torque and provided the back EMF sensing means sense that the rotor has turned sufficiently to be in a condition to connect the motor to the supply.

3. A starting circuit as claimed in claim 1 including an electrical energy storage device and means to charge the storage device, the second switching means being arranged to supply the starting current by discharging electrical energy from the storage device.

4. A starting circuit as claimed in claim 3 wherein the back EMF sensing means comprise voltage measuring means to measure the voltage across the energy storage device when the second switching means is deactivated.

5. A starting circuit as claimed in claim 1 including comparison means to compare the magnitude of the detected back EMF with a pre-determined value to thereby ascertain whether the motor is in a condition for connection of the operating supply.

6. A starting circuit as claimed in claim 1 wherein the back EMF detection means provide an indication of the magnitude of the back EMF over time.

7. A starting circuit as claimed in claim 6 wherein the comparison means compare a characteristic of the magnitude of the back EMF over a time period and compare the sensed time period with a predetermined time period to ascertain whether the motor is in a condition for connection to the operating supply.

8. A starting circuit as claimed in claim 5 wherein the comparison means comprise a comparator.

9. A starting circuit as claimed in claim 2 including an electrical energy storage device and means to charge the storage device, the second switching means being arranged to supply the starting current by discharging electrical energy from the storage device.

10. A starting circuit as claimed in claim 9 wherein the back EMF sensing means comprise voltage measuring means to measure the voltage across the energy storage device when the second switching means is deactivated.

11. A method of starting an electric induction motor having a plurality, of phase windings, the method comprising the steps of delivering a uni-directional current to the motor to establish a stationary rotor flux in the rotor of the motor, delivering a starting current to the motor to produce a stator flux at an angle to the stationary rotor flux to produce a motor starting torque, detecting the back EMF produced by rotation of the rotor in response to the starting torque, and determining whether one or more characteristics of the detected back EMF indicates that the motor is in a condition for connection to an operating supply.

12. A method as claimed in claim 11 including the step of connecting the motor to the operating supply if one or more characteristics of the detected back EMF indicates that the motor is in a condition for connection to the operating supply.

13. A method as claimed in claim 11 wherein the back EMF is measured from a motor winding.

14. A method as claimed in claim 11 wherein the energy for the starting current is accumulated in an energy storage device prior to delivery of the starting current.

15. A method as claimed in claim 14 wherein the back EMF is detected by measuring the voltage across the energy storage device following disconnection of the energy storage device.

16. A method as claimed in claim 14 wherein a characteristic of the back EMF of a motor winding is sensed over time to sense the time period over which the characteristic is repeated, and the sensed time period is compared with a predetermined time period to determine whether the motor is in a condition for starting.

17. A method as claimed in claim 16 wherein, if the motor is in a condition for starting, the method steps of delivering a uni-directional current to a winding, delivering a starting current and sensing the back EMF are repeated, and the back EMF is measured by detecting the voltage across the energy storage device after disconnection of the energy storage device, and if the voltage across the energy storage device exceeds a predetermined value, connecting the motor to the operating supply.

* * * * *